Oct. 2, 1934.  F. W. JUENGST ET AL  1,975,464
ELECTRIC TEA KETTLE
Filed Jan. 6, 1933
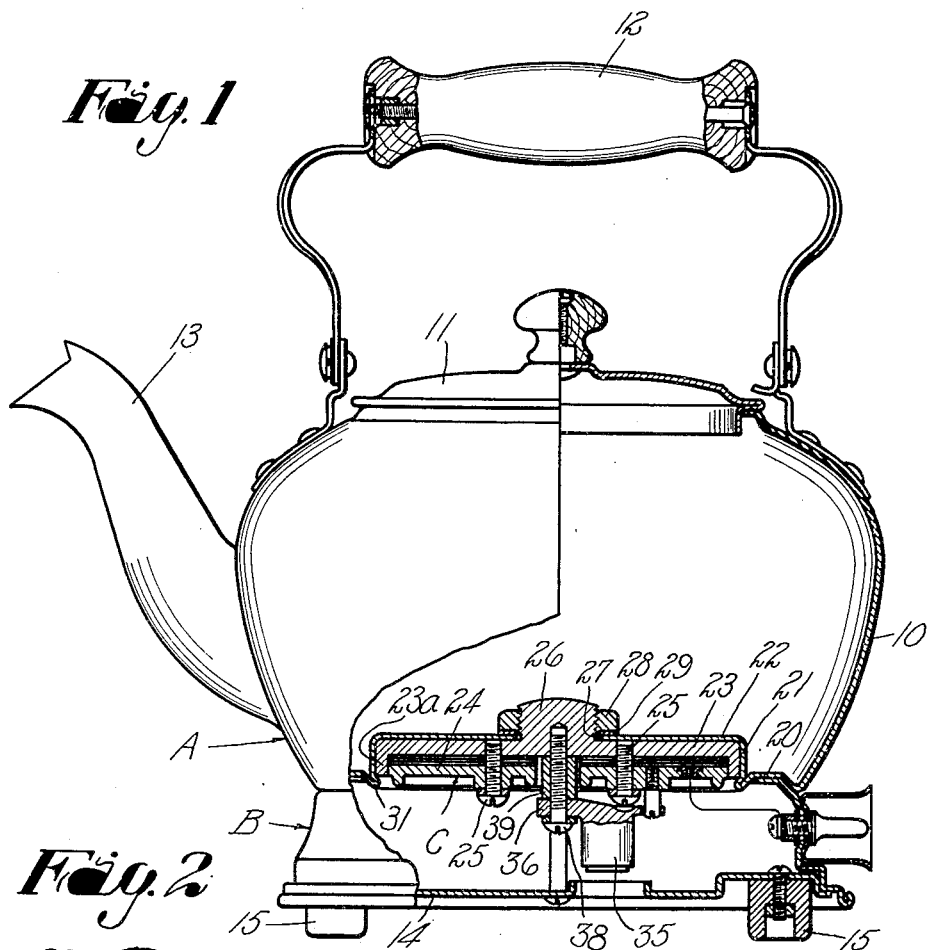
Fig.1
Fig.2
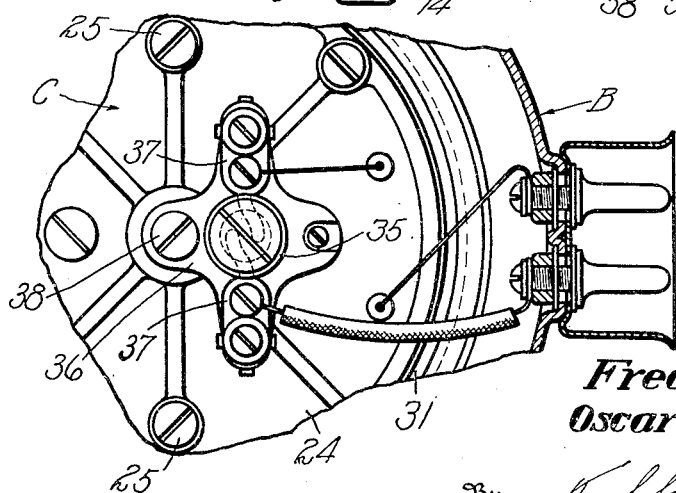
Inventor
Fred W. Juengst
Oscar M. Anderson
By K. Clay Lindsey
Attorney Patented Oct. 2, 1934

1,975,464

UNITED STATES PATENT OFFICE 1,975,464

ELECTRIC TEA KETTLE

Fred W. Juengst and Oscar M. Anderson, New Britain, Conn., assignors to Landers, Frary & Clark, New Britain, Conn., a corporation of Connecticut Application January 6, 1933, Serial No. 650,386

4 Claims. (Cl. 219—44)

The present invention relates to electric tea kettles and, more particularly, to a tea kettle of this kind in which the heating unit is disposed in contact with the bottom of the bowl of the kettle.

Various attempts have been made to provide a commercially practical electrically heated tea kettle with a unit positioned against the bottom of the bowl, but these attempts have heretofore been unsuccessful so far as we are aware because a kettle of this sort requires a unit of high wattage, say one thousand watts, and with such a unit, greatest difficulty is experienced in carrying away the heat from the unit fast enough to prevent overheating. It has been found that, due to the overheating of the unit, the unit soon burns out, and the bottom of the kettle and the top plate of the unit buckle or warp so as to destroy the intimate thermal contact therebetween and impair the efficiency of the kettle.

It is the object of the present invention to provide a highly efficient and practical electrically heated tea kettle in which the above and other difficulties are overcome. In accordance with the present invention, the heating unit is securely interlocked in close thermal contact with the bottom of the kettle so that the heat may be conducted directly to the water in the kettle and which water will carry the heat away from the unit with sufficient rapidity to prevent overheating of the unit. The top plate of the unit and the bottom of the kettle are securely locked together, both at the central part of these portions and at their edges so that they reinforce one another, so to speak, and cannot separate, under expansion and contraction, as the kettle is heated up and cooled, which means that the top plate of the unit and the engaging portions of the bottom of the kettle are maintained in close thermal contact, and buckling or warping is prevented.

A further object of the present invention is to provide an improved device of this character which comprises relatively few parts, is cheap to manufacture, is simple in construction, and efficient and reliable in operation.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take, Fig. 1 is a side view, partly in elevation and partly in section, of our improved tea kettle; and Fig. 2 is a fragmentary bottom plan view of the same with a portion of the base thereof removed and with parts in section.

Referring to the drawing in detail, A designates generally the bowl of the kettle which is positioned upon and suitably secured to the base B and C designates generally the heating unit. The bowl may be provided with the usual cover 11, handle 12, and spout 13. The base may have a removable closure plate 14 provided with a plurality of feet 15.

The bottom wall structure 20 of the kettle, which is preferably formed of aluminum, has an upstanding central boss provided with a circumferential or cylindrical wall 21 and a top wall 22. This boss forms a recess or chamber for the reception of the heating unit C, which may be of any suitable sort, but which is here shown as being of a type similar to that illustrated in the patent to Joseph F. Lamb, No. 1,060,264. It comprises a top radiating plate 23, a bottom radiating plate 24, and a suitable resistance wire between the plates, the resistance wire being interposed between suitable insulating sheets of mica or the like. These sheets, together with the element therebetween, are clamped between the top and bottom radiating plates, as by means of screws 25. The upper radiating plate is provided with a peripheral depending skirt 23a.

In accordance with the present illustrated disclosure of the invention, the upper radiating plate 23 has a centrally located upstanding threaded stud or stem 26 which extends upwardly through a centrally located opening 27 in the top wall 22 of the boss. The upper end of this stud receives a nut 28 adapted to be screwed down onto the bottom wall structure of the bowl so as to securely clamp the central portion of the top plate against the bottom of the bowl. A packing 29 may be interposed between the nut and the upper surface of the top wall 22 to insure a leak-proof joint.

The recess provided by the upwardly extending hollow boss is of such diameter as to closely receive the upper radiating plate so that there is a close thermal contact between the periphery of that plate and the circumferential wall of the boss. The peripheral wall of the recess extends downwardly below the lower edge of the skirt 23a, and is folded over upon itself so as to form a bead or rib 31. This folded over portion or rib is pressed or clamped inwardly around the lower edge of the upper top plate so as to firmly retain the heating unit within the recess of the boss. In the operation of clamping or spinning the bead over the lower edge of the top plate, the top wall and the peripheral wall of the boss are drawn tightly against and into very close engagement with the top and peripheral surfaces, respectively of the top radiating plate, and this close intimate engagement is maintained indefinitely, in spite of the fact that the unit may be repeatedly heated up and cooled and the coefficients of expansion of the metals composing the radiating plate and the bottom wall of the bowl may be different. Thus, separation of the bottom of the bowl from the unit is prevented so that the heat conductivity between the unit and the bottom of the bowl is at no time disturbed, which means that the water at all times is enabled to carry away the heat from the unit with sufficient rapidity to prevent overheating of the unit. Furthermore, since the boss is clamped at the central portion against the top plate by means of the stem 26 and nut 28 and the peripheral wall is clamped at its lower edge to the lower edge of the top radiating plate, buckling of these walls is guarded against.

In order to prevent overheating of the utensil in the event that the water in the bowl becomes dangerously low or exhausted through inadvertence or carelessness, there is associated with the heating unit a protective device which may be in the form of a fuse such as disclosed in the Joseph F. Lamb Patent No. 1,060,266 and the George E. Curtiss Patent No. 1,507,587. The fuse may be located within a tubular hub 35 formed integrally with a bracket 36 which carries the spaced terminals 37. The bracket is connected to the central portion of the top radiating plate of the heating unit by means of a screw 38. Interposed between the top radiating plate and this bracket and surrounding the screw is a spacing sleeve 39. It will be noted that the fuse supporting bracket is spaced from the heating unit and is supported therefrom at one point only, namely, by the screw 38, and this screw is received in a socket in the stem 26 of the upper radiating plate and that this stem is exposed to the cooling effect of the water in the bottom of the bowl. The fuse will, therefore, be maintained in a cool condition so long as any substantial amount of water remains in the bowl. This prevents inadvertent and premature burning out of the fuse. However, as soon as the quantity of water in the bowl is practically exhausted, the stem 26 and the screw or stud 38 will be deprived of this cooling effect and the stud will become heated immediately and, in turn, transmit its heat to the bracket 36 and the fuse, with the result that the fuse will break the current immediately and thus save the kettle from damage due to overheating.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. An electric tea kettle comprising a bowl having a bottom wall structure provided with an upstanding boss having an annular side wall and a top wall, a heating unit having a top radiating plate disposed within the recess of said boss and having a top surface in intimate thermal engagement with said top wall and having its annular side wall in intimate thermal contact with said side wall of said boss, and means for securely clamping said top wall against the top surface of said radiating plate, the side wall of said boss having a portion extending beyond the free edge of said plate, said extended portion of said side wall being crimped around and against the free edge of said plate whereby to draw the walls of said recess tightly against said plate and to hold said plate tightly against said top wall and in intimate thermal contact therewith.

2. An electic tea kettle comprising a bowl having a bottom provided with a boss having a peripheral side wall and a top wall, a heating unit disposed within said boss and having a radiating plate provided with a peripheral surface and a top surface in intimate thermal contact with the side wall and top wall, respectively, of said boss, said side wall extending downwardly beyond said radiating plate, said extended portion being folded over upon itself to provide a bead, said bead being spun over the lower edge of said radiating plate to draw said side wall and top wall of the boss into intimate and thermal engagement with the peripheral and top surfaces of the radiating plate, said radiating plate having an upwardly extending centrally located screw threaded stud extending through the center of said top wall, and a nut threaded upon said stud for clamping said top wall securely against said radiating plate.

3. An electric tea kettle comprising a bowl provided with a bottom having an upstanding boss provided with a top wall and a side wall, a heating unit having a top radiating plate disposed within the recess of said boss and in close thermal contact with said top wall and side wall, said radiating plate having a centrally dispose screw threaded stud extending upwardly through the center of said top wall, a nut threaded on said stud to clamp said top wall in intimate thermal contact with said radiating plate, a fuse for said heating unit, a bracket supporting said fuse and disposed below said unit, and means for connecting said bracket in spaced relation to said heating unit, said means being connected to said plate immediately beneath said stud.

4. An electric tea kettle comprising a bowl provided with a bottom having an upstanding boss provided with a top wall and a side wall, a heating unit having a top radiating plate disposed within the recess of said boss and in close thermal contact with said top wall and side wall, said radiating plate having a centrally disposed screw threaded stud extending upwardly through the center of said top wall, a nut threaded on said stud to clamp said top wall in intimate thermal contact with said radiating plate, a fuse for said heating unit, a bracket supporting said fuse and disposed below said unit, a screw for connecting said bracket to said radiating plate in spaced relation to said unit, said screw being connected to said plate immediately beneath said stud, and a sleeve about said screw for maintaining said bracket and fuse in spaced relation to the heating unit.

FRED W. JUENGST.
OSCAR M. ANDERSON.